(12) United States Patent
Sasaki (10) Patent No.: US 9,491,228 B2
(45) Date of Patent: Nov. 8, 2016

(54) REDUNDANCY DEVICE (75) Inventor: Kenichi Sasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 394 days.

(21) Appl. No.: 13/979,788

(22) PCT Filed: Dec. 7, 2011

(86) PCT No.: PCT/JP2011/006851
§ 371 (c)(1),
(2), (4) Date: Jul. 15, 2013

(87) PCT Pub. No.: WO2012/120578
PCT Pub. Date: Sep. 13, 2012

(65) Prior Publication Data
US 2013/0304793 A1 Nov. 14, 2013

(30) Foreign Application Priority Data

Mar. 10, 2011 (JP) ................................. 2011-053050

(51) Int. Cl.
| | | |
|---|---|---|
| *G06F 15/16* | (2006.01) | |
| *H04L 29/08* | (2006.01) | |
| *G06F 11/18* | (2006.01) | |

(52) U.S. Cl.
CPC ............ *H04L 67/10* (2013.01); *G06F 11/181* (2013.01); *G06F 11/182* (2013.01); *G06F 11/187* (2013.01)

(58) Field of Classification Search
CPC ........... H01L 2924/00; G06F 11/1658; G06F 11/181; G06F 11/165; G06F 11/184; G06F 11/187; G06F 11/2007; H04L 69/40; B60W 50/0205
See application file for complete search history.

(56) References Cited

U.S. PATENT DOCUMENTS

| | | | | |
|---|---|---|---|---|
| 3,859,513 A | * | 1/1975 | Chuang | ................. G06F 11/181 326/14 |
| 7,729,827 B2 | * | 6/2010 | Sakurai et al. | ............... 701/31.7 |

(Continued)

FOREIGN PATENT DOCUMENTS

| | | |
|---|---|---|
| CN | 101592954 A | 12/2009 |
| JP | 08 272411 | 10/1996 |

(Continued)

OTHER PUBLICATIONS

Al-Arian, S., et al. 'HPTR: Hardware partition in time redundancy technique for fault tolerance'. IEEE SOUTHEASTCON '92 Apr. 1992, pp. 630-633. INSPEC [online]. IEEE [retrieved on Nov. 17, 2015]. Retrieved from: PROQUEST. Accession No. 4314986.*

(Continued)

*Primary Examiner* — Kevin Bates
*Assistant Examiner* — Dae Kim
(74) *Attorney, Agent, or Firm* — Oblon, McClelland, Maier & Newstadt, L.L.P.

(57) ABSTRACT

A computing unit computes a computed value for input data. A comparing unit compares the computed value of the computing unit with a computed value of another node which is included in an input/output set. An output unit outputs the computed value as output data of a node itself when the result of the comparison by the comparing unit shows that the computed value matches either one of computed values. When the computed value does not match any one of the computed values of other nodes, a transferring unit adds the computed value of the node itself to the input/output set, and transfers the input/output set to another node.

8 Claims, 9 Drawing Sheets

(56) References Cited

U.S. PATENT DOCUMENTS

| | | | |
|---|---|---|---|
| 2002/0138550 A1 | 9/2002 | Mori et al. | |
| 2005/0120115 A1* | 6/2005 | Weedmark | H04L 12/5601 709/225 |
| 2007/0076593 A1* | 4/2007 | Sakurai | B60W 50/0205 370/219 |
| 2008/0123522 A1* | 5/2008 | Elliott | H04L 12/40202 370/220 |
| 2009/0116502 A1* | 5/2009 | Hall | G06F 11/182 370/406 |
| 2009/0183033 A1* | 7/2009 | Ando | H04L 43/0823 714/43 |
| 2010/0030790 A1* | 2/2010 | Fukuda | G06F 17/30194 707/636 |
| 2010/0122003 A1* | 5/2010 | Hu | H04B 10/60 710/110 |

FOREIGN PATENT DOCUMENTS

| | | |
|---|---|---|
| JP | 2002 287997 | 10/2002 |
| JP | 2006 172140 | 6/2006 |
| JP | 2009 009277 | 1/2009 |
| JP | 2009 086938 | 4/2009 |
| JP | 2010 122731 | 6/2010 |
| JP | 2010 287127 | 12/2010 |

OTHER PUBLICATIONS

International Search Report Issued Feb. 7, 2012 in PCT/JP11/006851 Filed Dec. 7, 2011.
Combined Chinese Office Action and Search Report issued Oct. 10, 2015 in Patent Application No. 201180068562.4 (with English language translation and English translation of categories of cited documents).

* cited by examiner

| Input | Output |
|---|---|
| 10 | 20 |
| 5 | 10 |
| 7 | 14 |
| Unregistered | Unregistered |
| ... | ... |

REDUNDANCY DEVICE

FIELD OF THE INVENTION

The present invention relates to a redundancy device for use in a distributing system that groups a plurality of ECUs (Electronic Control Units) each having the same functions and the same hardware (referred to H/W from here on) structure as any other ECU, and that enables ECUs included in a group to exchange inputs and outputs with one another to compare their respective outputs with one another, thereby providing redundancy for the system.

BACKGROUND OF THE INVENTION

A conventional redundancy technology implements error detection and fault redundancy functions by carrying out the same process on inputs by using plural pieces of hardware according to a required degree of redundancy and comparing outputs with one another or performing a majority decision on the outputs. Although a dual comparison system has a merit in cost compared with a triple majority decision because the number of pieces of hardware required for the dual comparison system to carry out the same process can be two, the dual comparison system cannot determine which hardware is faulty when the result of a comparison between the outputs shows that these outputs do not match each other. In contrast, although a triple majority decision system has a high cost, the triple majority decision system can determine that, when one node suffers a breakdown, the hardware which has outputted an output not matching any of the other outputs is faulty. Further, because a triple majority decision system selects a correct output as a result of performing a majority decision for a fault occurring in one piece of hardware, the triple majority decision system can mask the fault. As a conventional redundancy device, as described in, for example, patent reference 1, there is a redundancy device equipped with verification computers disposed therein, for comparing processing states and computation results in these verification computers with each other, and, when the processing states match each other and the computation results match each other, determines that the computation results are correct.

RELATED ART DOCUMENT

Patent Reference

Patent reference 1: Japanese Unexamined Patent Application Publication No. 2010-122731

SUMMARY OF THE INVENTION

Problems to be Solved by the Invention

However, severe cost restrictions are imposed on a distributing system such as a vehicle-mounted system, and the cost of an addition of hardware required to achieve redundancy in the system including a dual comparison system, except for some modules critical to ensuring safety, can't be accepted. Because the above-mentioned conventional redundancy method requires plural pieces of H/W each for carrying out the same process in ECUs, and hence has a large cost required to achieve redundancy, a method of implementing the same functions at a low cost has been desired. A battery system for use in an electric vehicle (referred to as EV from here on) which has been being developed has a plurality of battery cells mounted therein, and each of the battery cells has an ECU (electronic control unit) for control. Between these ECUs are connected to one another via an identical network and can exchange data with one another.

The present invention is made in order to solve the above-mentioned problem, and it is therefore an object of the present invention to provide a redundancy device that can achieve redundancy in a system at a low cost.

Means for Solving the Problem

In accordance with the present invention, there is provided a redundancy device that implements redundancy by grouping a plurality of nodes connected to a network, and enabling nodes within each group to exchange input and output data with one another within the group, in which each of the nodes includes: a computing unit for receiving either input data or an input/output set including the input data and a computed value of another node within the group, and carrying out a computation on the input data; a comparing unit for, when the input/output set is inputted thereto, comparing a computed value of the computing unit with the computed value of the other node; and an output unit for, when the result of the comparison by the comparing unit shows that the computed value of the computing unit matches either one of computed values, outputting the computed value as output data of the node itself; and a transferring unit for, when the result of the comparison by the comparing unit shows that the input/output set does not include any computed value matching the computed value of the computing unit, adding the computed value of the computing unit to the input/output set and then transferring this input/output set to another node.

Advantages of the Invention

Because when the result of the comparison by the comparing unit shows that the computed value matches either one of computed values, the redundancy device in accordance with the present invention outputs the computed value as output data of the node itself, whereas the input/output set does not include any computed value matching the computed value of the computing unit, the redundancy device adds the computed value of the node itself to the input/output set and then transfers this input/output set to another node, redundancy can be achieved in the system at a low cost.

EMBODIMENTS OF THE INVENTION

In accordance with the present invention, a redundancy function is implemented by grouping ECUs each of which is a node connected to an identical network and has the same function and the same H/W structure as any other ECU, and by enabling ECUs within each group to exchange inputs and outputs with one another. Each ECU acquires input data, and carries out a computation on the basis of the input data to acquire output data. After that, each ECU transmits a set of the input data and the output data (referred to as an input/output set from here on) to another ECU within the group. The other ECU which has received the input/output set carries out a computation on the basis of the input data to acquire output data and makes a comparison between the output data acquired thereby and a received set of output data. Because the other ECU which has received the input/output set has the same function and the same H/W structure as the ECU which has transmitted the input/output set to the other ECU, the other ECU acquires the same output for the same input data when the other ECU is functioning normally. When the computed output data matches either one of the received set of output data, the redundancy device outputs the output data value. In contrast, when the computed output data does not match any one of the received set of output data, the other ECU adds the computation result acquired thereby to the end of the input/output set and transmits this input/output set to another ECU within the group. This data transfer in the case in which the output data does not match any one of the received set of output data is carried out while a response time period (referred to as a deadline from here on) which is requested of applications is satisfied. When not finding out an output matching either one of the received set of output data before violating the deadline, the redundancy device outputs a previous value or a default value. Hereafter, embodiments of this redundancy device will be explained.

Embodiment 1.

Figure 1:
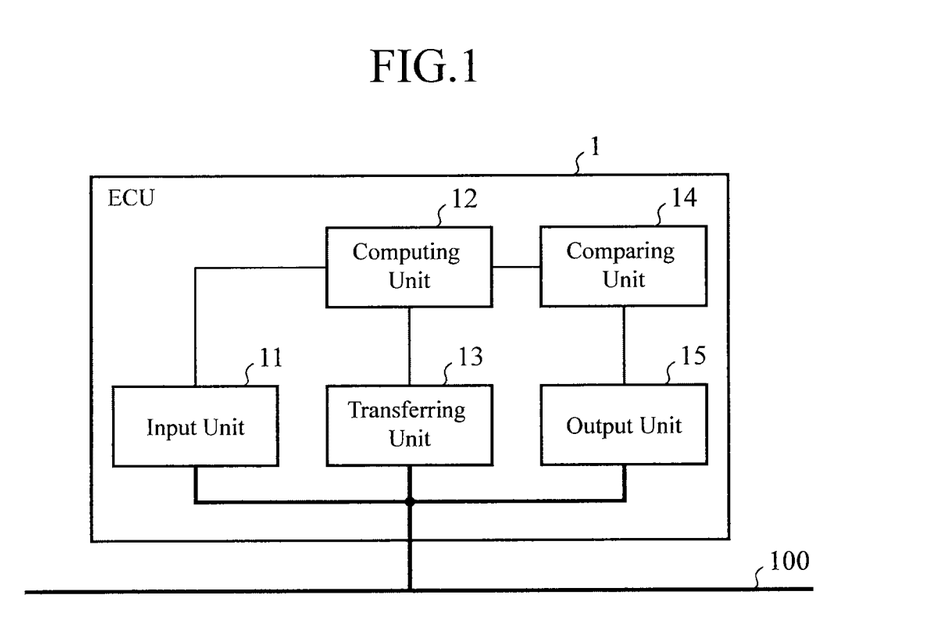
FIG. 1 is a block diagram showing one node in a redundancy device in accordance with Embodiment 1 of the present invention.
Figure 2:
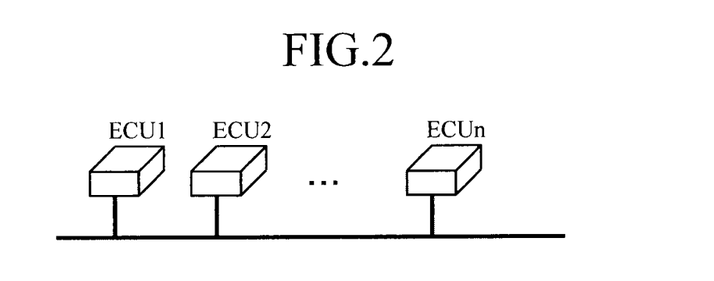
FIG. 2 is a block diagram of a system which is assumed be a target to which redundancy device in accordance with Embodiment 1 of the present invention is applied.

FIG. 1 is a block diagram showing an ECU in a redundancy device in accordance with Embodiment 1 of the present invention. Only one ECU 1 is shown in this figure. The ECU 1 shown in this figure includes an input unit 11, a computing unit 12, a transferring unit 13, a comparing unit 14, and an output unit 15, and is connected to a vehicle-mounted LAN 100. FIG. 2 is a block diagram of a distributing system which is assumed to be a target for the present invention. A plurality of ECUs each having the same structure as the ECU 1 shown in FIG. 1 are connected to the identical network. In this embodiment, each of the plurality of ECUs 1, 2, . . . , and n (n is an arbitrary integer) has the structure of the ECU 1 shown in FIG. 1. Hereafter, the functions of each ECU will be explained.

The input unit 11 is a functional unit for acquiring data which is required for control by using sensors and so on. The computing unit 12 is a functional unit for carrying out a computation according to an application on the basis of the input data which the input unit 11 or the transferring unit 13 has acquired. The transferring unit 13 is a functional unit for making a set of the input data and a computed value acquired from the computing unit 12 (referred to as an input/output set from here on), and transmitting a message to another ECU within the group. The input/output set has a configuration as shown below.

{input data: output data 1: output data 2: . . . : output data n} where n is an arbitrary integer, and the output data (computed value) of the ECU in question is added every time when transferring the input/output set. Therefore, in each embodiment, the computed values included in the input/output set are referred to as the output data set. When receiving the input/output set, the transferring unit 13 extracts the input data from the input/output set and carries out a computation on the input data by using the computing unit 12. The comparing unit 14 is a functional unit for comparing the computed value which the computing unit 12 acquires for the input data of the received input/output set with the output data set of the received input/output set. The output unit 15 is a functional unit for outputting the computed value which the comparing unit 14 has determined matches one output data of the output data set. The vehicle-mounted LAN 100 is a network for communication-connecting among the plurality of ECUs 1, 2, and . . . , as shown in FIG. 2 and so on.

Each of the ECUs 1, 2, . . . , and n can consist of a computer, and each of the processes carried out by the input unit 11 to the output unit 15 is implemented via software corresponding to the process and via hardware including a CPU and a memory required to execute the software.

Figure 3:
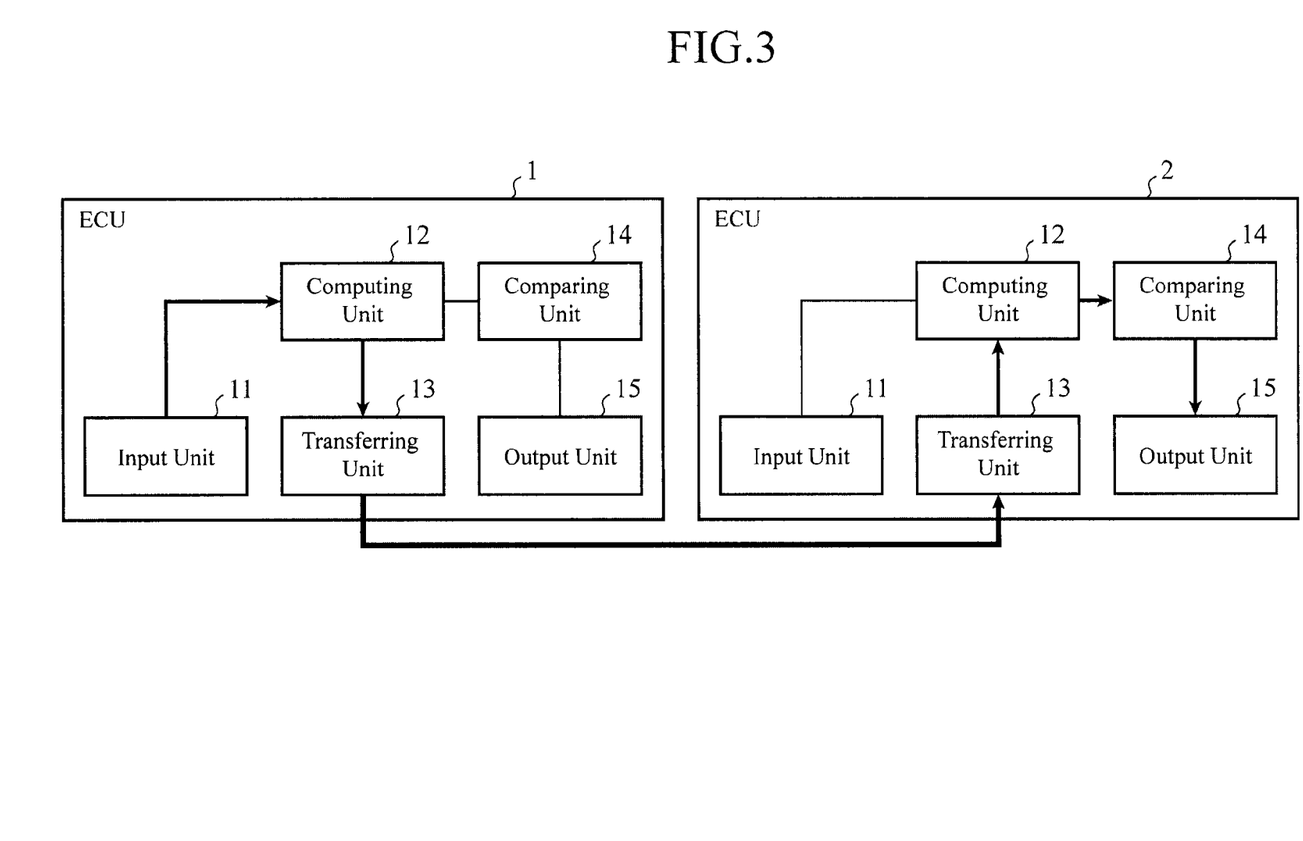
FIG. 3 is an explanatory drawing showing an operation of transferring data between two nodes in the redundancy device in accordance with Embodiment 1 of the present invention.

FIG. 3 is an explanatory drawing showing an operation which is extracted from the comparing processes carried out by the ECUs 1 and 2 shown in FIG. 2. The ECU 1 acquires input data by using the input unit 11, and acquires a computed value as output data by using the computing unit 12. The ECU 1 then makes a set of the input data and the computed value (referred to as an input/output set from here on) by using the transferring unit 13, and transmits the input/output set to another ECU within the group (in this case, the ECU 2). When receiving the input/output set, the ECU 2 extracts the input data from the input/output set and then provides the input data to the computing unit 12. The comparing unit 14 compares the data outputted thereto from the computing unit 12 with the output data set included in the received input/output set. When the computed value acquired from the computing unit 12 matches either one of the output data in the output data set, the comparing unit outputs the matching computed value by using the output unit 15.

Figure 4:
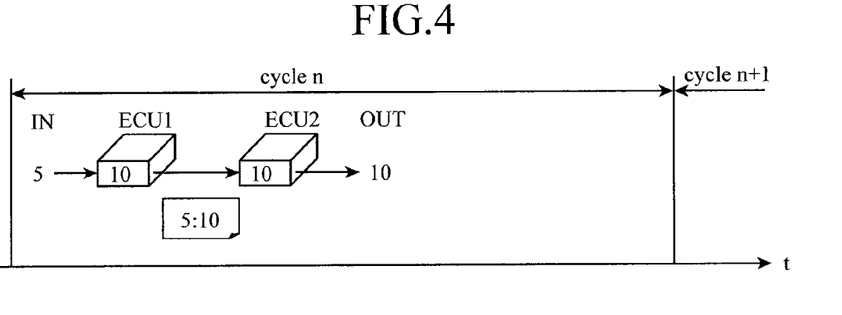
FIG. 4 is an explanatory drawing showing the operation of the redundancy device in accordance with Embodiment 1 of the present invention under normal operating conditions.
Figure 5:
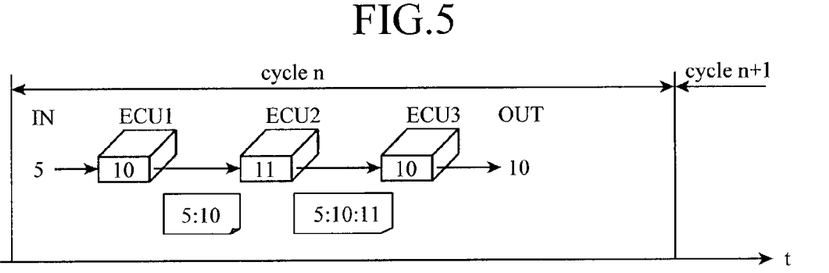
FIG. 5 is an explanatory drawing showing the operation of the redundancy device in accordance with Embodiment 1 of the present invention under abnormal operating conditions.

An operation which is performed when all the ECUs 1, 2, and 3 are functioning normally and an operation which is performed when the ECU 2 suffers a breakdown, focusing attention to the ECU 1 as a start node, in a case in which a triple majority decision system is constructed of the ECUs 1, 2, and 3 are shown in FIGS. 4 and 5. In the operation shown in FIG. 4, the ECU 1 acquires input data (5) by using the input unit 11, and carries out a computation on the input data by using the computing unit 12 to acquire a computed value (10). In this case, the numeral inside ( ) shows a data value, and the numerals inside the parentheses correspond to the value of "IN", that of "ECU1", that of "ECU2", . . . , and that of "OUT" in the figure, respectively. The ECU 1 then transmits the input/output set {5:10} by using the transferring unit 13. The ECU 2 receives the input/output set {5:10} and carries out a computation on the input data (5) by using the computing unit 12 to acquire a computed value (10). The comparing unit 14 compares the computed value (10) of the computing unit 12 with the received output data set {10}, and outputs (10) by using the output unit 15 because the computed value is (10) and hence matches the value of the received output data set.

In the operation shown in FIG. 5, the ECU 1 acquires input data (5) by using the input unit 11, and carries out a computation on the input data by using the computing unit 12 to acquire a computed value (10). The ECU 1 then transmits the input/output set {5:10} by using the transferring unit 13. The ECU 2 receives the input/output set {5:10} and carries out a computation on the input data (5) by using the computing unit 12 to acquire a computed value (11). Because the ECU 2 is faulty, the computed value is (11) and hence does not match any output data of the received output data set, and therefore the comparing unit 14 outputs a result showing a mismatch. Because the comparison result shows a mismatch, the transferring unit 13 adds the value (11) which the computing unit 12 has outputted to the end of the input/output set and transfers the input/output set 15:10:111 to the ECU 3 within the group. The ECU 3 receives the input/output set {5:10:11} and carries out a computation on the input data (5) by using the computing unit 12 to acquire a computed value (10). The comparing unit 14 compares the value (10) which the computing unit 12 has outputted with the received output data set {10:11}, and outputs (10) using the output unit 15 because the output (10) matches one output data of the received output data set. The comparing unit 14 can determine that the ECU 2 which has added the output data (11) not matching the output is faulty when completing the comparison.

Figure 6:
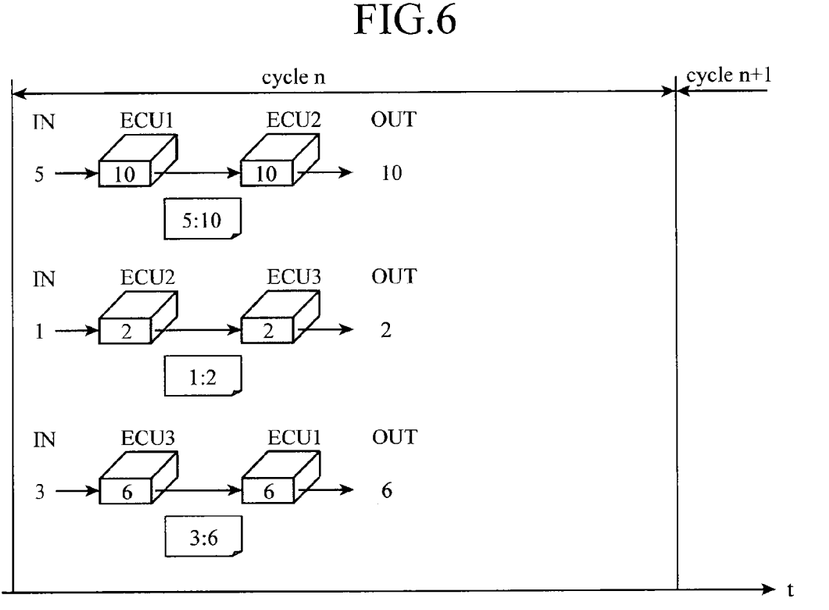
FIG. 6 is an explanatory drawing showing the operation of an entire triple majority decision system in the redundancy device in accordance with Embodiment 1 of the present invention under normal operating conditions.
Figure 7:
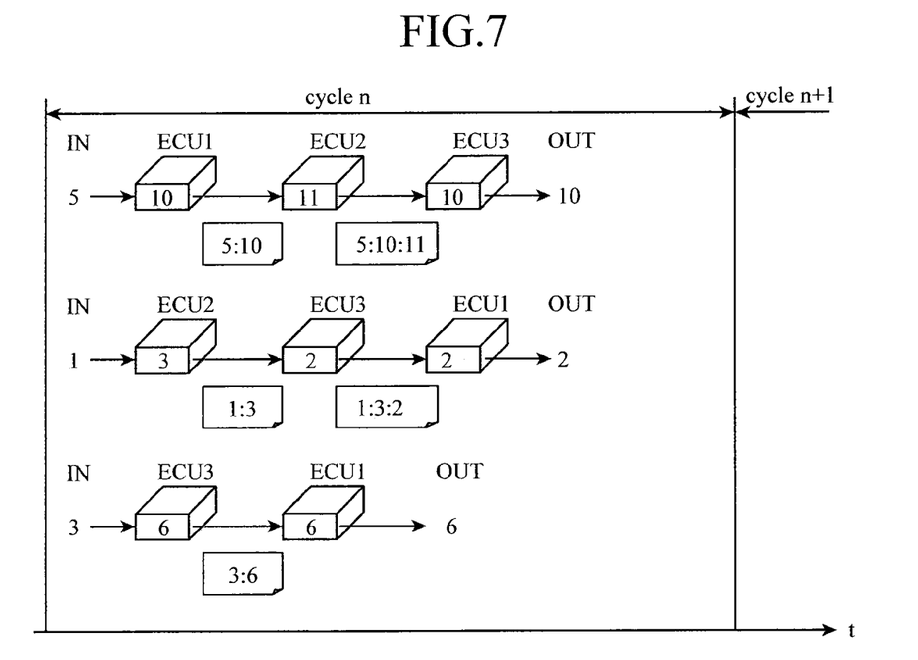
FIG. 7 is an explanatory drawing showing the operation of the entire triple majority decision system in the redundancy device in accordance with Embodiment 1 of the present invention under abnormal operating conditions.

FIG. 6 shows the operation of the whole system when all the ECUs are functioning normally. In every of all the ECUs, the result of a comparison between the output values of the two ECUs, such as the ECUs 1 and 2, shows that the output values match each other, like in the case of the operation of the ECU 1 described in FIG. 4, and the process is completed. FIG. 7 shows the operation of the whole system when the ECU 2 is faulty. The comparing process starting from a process carried out by the ECU 2 will be shown below. The ECU 2 acquires input data (1) by using the input unit 11, and carries out a computation on the input data by using the computing unit 12 to acquire a computed value (3). The ECU 2 then transmits an input/output set {1:3} by using the transferring unit 13. The ECU 3 receives the input/output set {1:3}, and carries out a computation on the input data (1) by using the computing unit 12 to acquire a computed value (2). Because the ECU 2 is faulty, no output data in the input/output set matches the computed value (2) of the ECU 3, and the comparing unit 14 outputs a result showing a mismatch. Because the comparison result shows a mismatch, the transferring unit 13 adds the value (2) which the computing unit 12 has outputted to the end of the input/output set and then transfers an input/output set {1:3:2} to the ECU 1 within the group. The ECU 1 receives the input/output set {1:3:2} and carries out a computation on the input data (1) by using the computing unit 12 to acquire a computed value (2). The comparing unit 14 compares the value (2) which the computing unit 12 has outputted with the received output data set {3:2}, and outputs (2) by using the output unit 15 because the output (2) matches one output data in the received output data set.

The comparing process starting from a process carried out by the ECU 3 will be shown below. The ECU 3 acquires input data (3) by using the input unit 11, and carries out a computation on the input data by using the computing unit 12 to acquire a computed value (6). The ECU 3 then transmits an input/output set {3:6} by using the transferring unit 13. The ECU 1 receives the input/output set {3:6}, and carries out a computation on the input data (3) by using the computing unit 12 to acquire a computed value (6). The comparing unit 14 compares the computed value (6) of the computing unit 12 with the received output data set {6}, and outputs (6) by using the output unit 15 because the computed value is (6) and hence matches the output data in the received output data set. In the comparing process starting from the process carried out by the ECU 3, the computed value matches the output data in the received output data set in the comparing process by the second ECU and the computed value is outputted, and neither excessive computations nor transmission of a message is carried out because the ECUs 3 and 1 are functioning normally.

Figure 8:
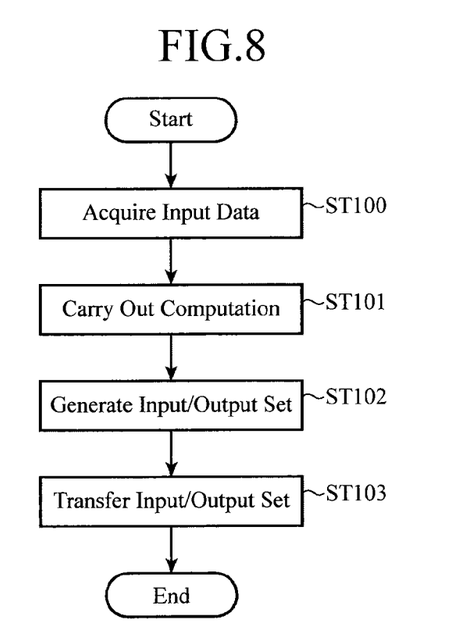
FIG. 8 is a flow chart showing the operation of a node which transmits an input/output set in the redundancy device in accordance with Embodiment 1 of the present invention.

FIG. 8 is a flow chart showing the operation of an ECU which acquires input data from the input unit 11 and starts a transfer of an input/output set. In this example, the above-mentioned ECU is expressed as a start node. The start node acquires input data from the input unit 11 at time intervals (step ST100), and carries out a computation on the input data by using the computing unit 12 to acquire a computed value (step ST101). The start node then transfers a set of the input data and the computed value (input/output set) to another ECU within the group by using the transferring unit 13 (steps ST102 and ST103).

Figure 9:
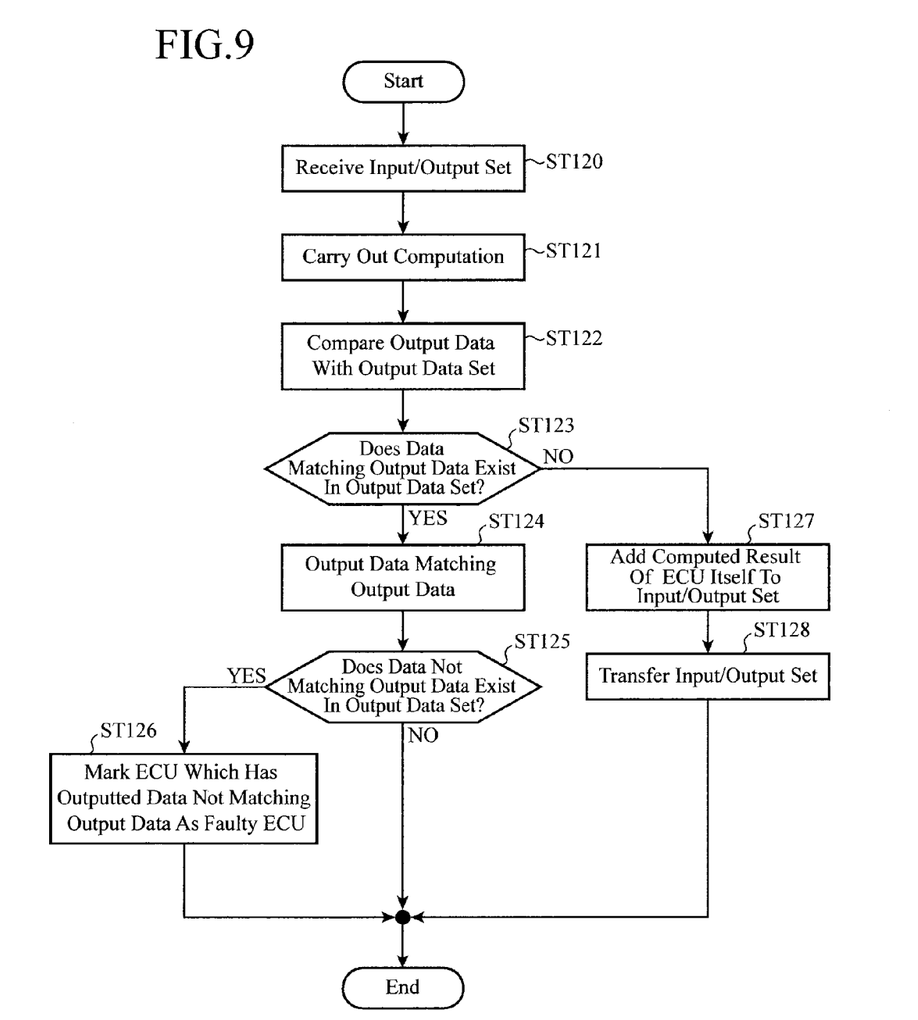
FIG. 9 is a flow chart showing the operation of a node which has received an input/output set in the redundancy device in accordance with Embodiment 1 of the present invention.

FIG. 9 is a flow chart showing the operation of an ECU which has received an input/output set from another ECU within the group. The ECU which has received an input/output set (step ST120) extracts the input data from the input/output set by using the transferring unit 13, and carries out a computation on the input data by using the computing unit 12 to acquire a computed value (output data) (step ST121). The ECU compares whether the output data which the ECU has acquired matches either one of the data in the output data set of the input/output set by using the comparing unit 14 (steps ST122 and ST123). When the output data set includes data matching the output data which the ECU has acquired, the ECU outputs the data by using the output unit 15 (step ST124). In addition, the ECU can also detect another ECU which has outputted data other than the data matching the output data acquired thereby as a faulty ECU (steps ST125 and ST126). This fault information is notified to another ECU within the group as needed. When the output data which the ECU has computed does not match any data of the output data set, the ECU adds the output data which the ECU has computed to the end of the input/output set by using the transferring unit 13, and transfers the input/output set to the next ECU within the group (steps ST127 and ST128).

In a case in which the output destination of the ECU is connected to the network as a network node, when the output at the time that the output data acquired by the ECU matches either one data in the output data set, the ECU can transmit a message destined for the node or can return the matching data to the start node. Further, when returning the data to the start node, the ECU can withdraw from the returning process just until a deadline comes, and, when not returning the data within the time period, can also output a default value, a previous value, or the computed result acquired thereby. As a result, even when the network is disconnected from the ECU, the ECU carries out an operation of outputting the computed result acquired thereby.

As previously explained, because the redundancy device in accordance with Embodiment 1 groups the plurality of nodes connected to the network and implements redundancy by enabling nodes within each group to exchange input output data with one another, and each node includes the computing unit for receiving either input data or an input/output set including the input data and a computed value of another node within the group, and carrying out a computation on the input data, the comparing unit for, when the input/output set is inputted thereto, comparing a computed value of the computing unit with the computed value of the other node, and the output unit for, when the result of the comparison by the comparing unit shows that the computed value matches either one of computed values, outputting this computed value as output data of the node itself, the load and the network load on each node can be reduced, and redundancy can be achieved in the system at a low cost.

Further, because the redundancy device in accordance with Embodiment 1 includes the transferring unit for, when the result of the comparison by the comparing unit shows that the input/output set does not include any computed value matching the computed value of the computing unit, adding the computed value of the computing unit to the input/output set and then transferring this input/output set to another node, the redundancy device can contribute to the detection of a faulty node within each group.

In addition, because when the result of the comparison by the comparing unit shows that the input/output set includes a computed value matching the computed value of the computing unit and a computed value not matching the computed value of the computing unit, the redundancy device in accordance with Embodiment 1 determines that the node which has transferred the computed value not matching the computed value of the computing unit is faulty, and notifies another node within the group to that effect, the redundancy device can easily detect a faulty node within each group.

Further, because in the redundancy device in accordance with Embodiment 1, the transferring unit transfers the input/output set to which the computed value of the computing unit is added to another node before a predetermined response time period has elapsed, the redundancy device can contribute to the detection of a faulty node while guaranteeing the execution time at the worst.

In addition, because the redundancy device in accordance with Embodiment 1 outputs a default value or a previous value when not finding out a computed value matching the computed value of the computing unit before a predetermined response time period has elapsed, the redundancy device can guarantee the execution time at the worst.

Embodiment 2.

Embodiment 2 relates to a redundancy device which is applied to a system in which data need to meet further reliability requirements. Because the structure of the redundancy device is the same as that in accordance with Embodiment 1 in terms of drawings, the structure of the redundancy device will be explained by using the structure shown in FIGS. 1 and 3.

Figure 10:
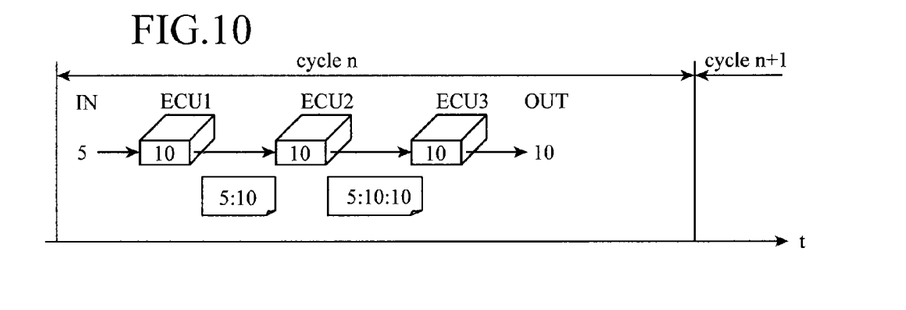
FIG. 10 is an explanatory drawing showing the operation of a redundancy device in accordance with Embodiment 2 of the present invention.

The redundancy device in accordance with Embodiment 2 is constructed in such a way as to carry out a transfer of data until arbitrary N data (N is an arbitrary integer) match one another according to the safety required for the system. More specifically, each of output units 15 of ECUs 1, 2, and . . . are constructed in such a way as to output its computed value when the number of computed values matching one another reaches a predetermined number N. FIG. 10 is an explanatory drawing showing an example of the operation of the redundancy device in accordance with Embodiment 2. The example shown in this figure is the one in which when three data match one another, the redundancy device outputs the computed value. In this example, while it is determined in the ECUs 1 and 2 that the data match each other, an input/output set is transferred up to the ECU 3 and the ECU 3 determines that the three data match one another and then outputs its computed value.

As previously explained, because when the computed values of N nodes (N is an arbitrary integer) match one another, the redundancy device in accordance with Embodiment 2 outputs this matching computed value as output data, the redundancy device can improve the reliability of the data to be outputted.

Embodiment 3.

Figure 11:
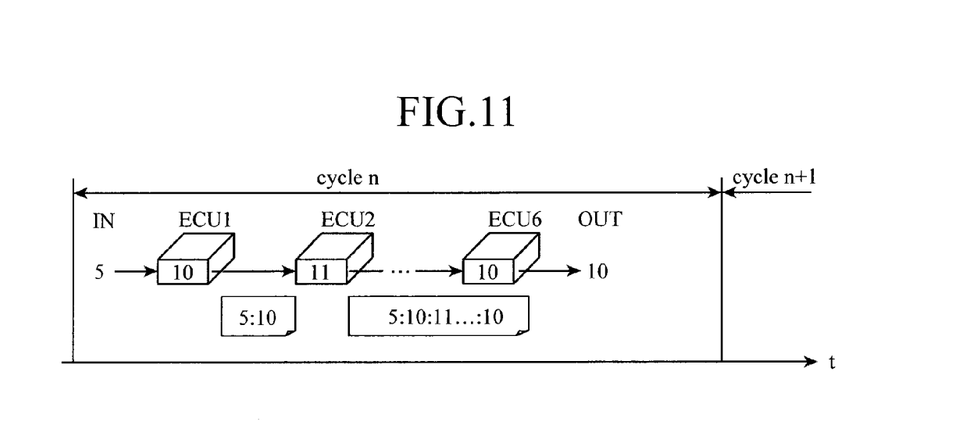
FIG. 11 is an explanatory drawing showing the operation of a redundancy device in accordance with Embodiment 3 of the present invention.

Embodiment 3 is an example in which a redundancy device carries out a transfer of data up to a predetermined number of times when there is a mismatch between data. Also in Embodiment 3, because the structure of the redundancy device is the same as that in accordance with Embodiment 1 in terms of drawings, the structure of the redundancy device will be explained by using the structure shown in FIGS. 1 and 3. The redundancy device in accordance with Embodiment 3 is constructed in such a way as to define a maximum number of times that the redundancy device carries out a transfer of data when there is a mismatch between data. More specifically, transferring units 13 of ECUs 1, 2, . . . , and n carry out a transferring operation as explained in Embodiment 1 until the number of times that the transferring units have carried out the transferring operation reaches the predetermined maximum number of transfer times. FIG. 11 is an explanatory drawing showing the operation of the redundancy device in accordance with Embodiment 3. In this example, the maximum number of transfer times is set to 5. In the example shown in the figure, because all output data outputted from ECUs located before the ECU 6 do not match one another, a transfer of data to up to the ECU 6 is carried out. In the example shown in the figure, because the output data of the ECU 6 matches one data in the output data set, the redundancy device outputs the data. In contrast, when the output data which the ECU 6 computes after the number of times that the transferring units have carried out the transferring operation has reached the maximum number of transfer times does not match any data in the output data set, the redundancy device outputs a previous value or a default value.

As previously explained, because the redundancy device in accordance with Embodiment 3 defines the maximum number of times that the redundancy device carries out a transfer of data when no computed value matching any other computed data is acquired, and the transferring units carries out a transfer of data until the number of times that the transferring units has carried out a transfer of data reaches the above-mentioned maximum number of times, the redundancy device can prevent unnecessary transferring operations from being performed continuously even when no computed value matching any other computed data is acquired.

Embodiment 4.

Figure 12:
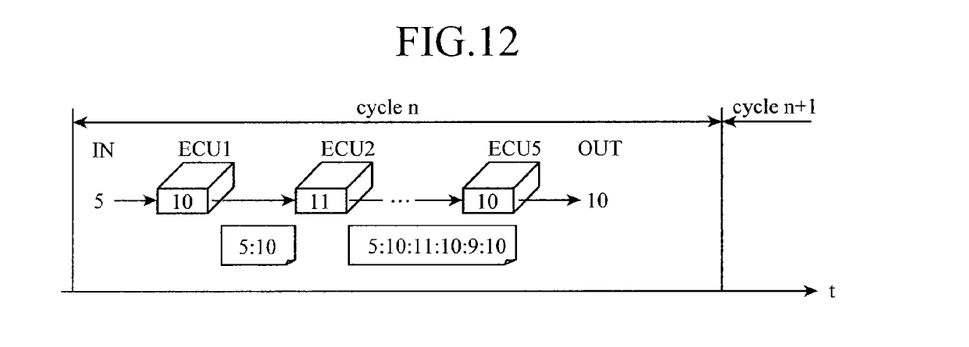
FIG. 12 is an explanatory drawing showing the operation of a redundancy device in accordance with Embodiment 4 of the present invention.

Embodiment 4 is an example in which a redundancy device carries out a transfer of data up to a predetermined number of times regardless of whether there is a match or mismatch between data. Also in Embodiment 4, because the structure of the redundancy device is the same as that in accordance with Embodiment 1 in terms of drawings, the structure of the redundancy device will be explained by using the structure shown in FIGS. 1 and 3. In the redundancy device in accordance with Embodiment 4, transferring units 13 of ECUs carry out a transferring operation up to the predetermined number of times. Further, each output unit 15 is constructed in such a way as to select the most frequently computed value from output data which have been transferred between ECUs through the transferring operations which have been carried out the predetermined number of times and output the computed value selected thereby. FIG. 12 is an explanatory drawing showing the operation of the redundancy device in accordance with Embodiment 4. In the example shown in this figure, the number of transfer times is set to 5. In the example shown in the figure, {10:11:10:9:10} is acquired as an output data set at the stage of the ECU 5, and an output unit 15 of this ECU outputs {10} which is the majority of the output data in the output data set.

As previously explained, because the redundancy device in accordance with Embodiment 4 groups the plurality of nodes connected to the network and implements redundancy by enabling nodes within each group to exchange input and output data with one another, and each node includes the computing unit for receiving either input data or an input/output set including the input data and a computed value of another node within the group, and carrying out a computation on the input data, the transferring unit for adding the computed value of the computing unit to the input/output set, and for transferring this input/output set to another node within the group until the number of times that the redundancy device has carried out the transferring operation reaches a predetermined number of times, and the output unit for selectively outputting the most frequently computed value from the computed value of the computing unit and the computed values of other nodes which have been acquired through the transferring operation which has been carried out the predetermined number of times, the redundancy device can prevent unnecessary transfer operations from being carried out continuously, and improve the reliability of the data to be outputted.

Embodiment 5.

Figure 13:
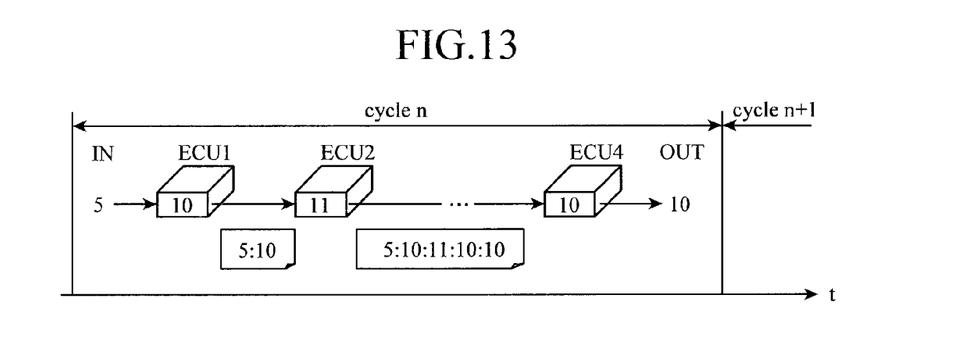
FIG. 13 is an explanatory drawing showing the operation of a redundancy device in accordance with Embodiment 5 of the present invention.

Embodiment 5 is an example in which a redundancy device carries out a transfer of data until a deadline comes regardless of whether there is a match or mismatch between data. Also in Embodiment 5, because the structure of the redundancy device is the same as that in accordance with Embodiment 1 in terms of drawings, the structure of the redundancy device will be explained by using the structure shown in FIGS. 1 and 3. In the redundancy device in accordance with Embodiment 5, a transferring unit 13 of each ECU carries out a transferring operation until a deadline comes. Further, an output unit 15 of each ECU is constructed in such a way as to selectively output the most frequently computed value from the output data which the redundancy device has acquired until the deadline comes. FIG. 13 is an explanatory drawing showing the operation of the redundancy device in accordance with Embodiment 5. In the example shown in the figure, an output data set {10:11:10:10} is acquired just before the deadline comes, and the output unit 15 outputs {10} which is the majority of the output data in the output data set.

As previously explained, because the redundancy device in accordance with Embodiment 5 groups the plurality of nodes connected to the network and implements redundancy by enabling nodes within each group to exchange input and output data with one another, and each node includes the computing unit for receiving either input data or an input/output set including the input data and a computed value of another node within the group, and carrying out a computation on the input data, the transferring unit for adding the computed value of the computing unit to the input/output set, and for carrying out a transfer of this input/output set to another node within the group during a predetermined response time period, and the output unit for selectively outputting the most frequently computed value from the computed value of the computing unit and the computed values of other nodes which have been acquired within the predetermined response time period, the redundancy device can prevent unnecessary transfer operations from being carried out continuously, and improve the reliability of the data to be outputted.

Embodiment 6.

Figure 14:
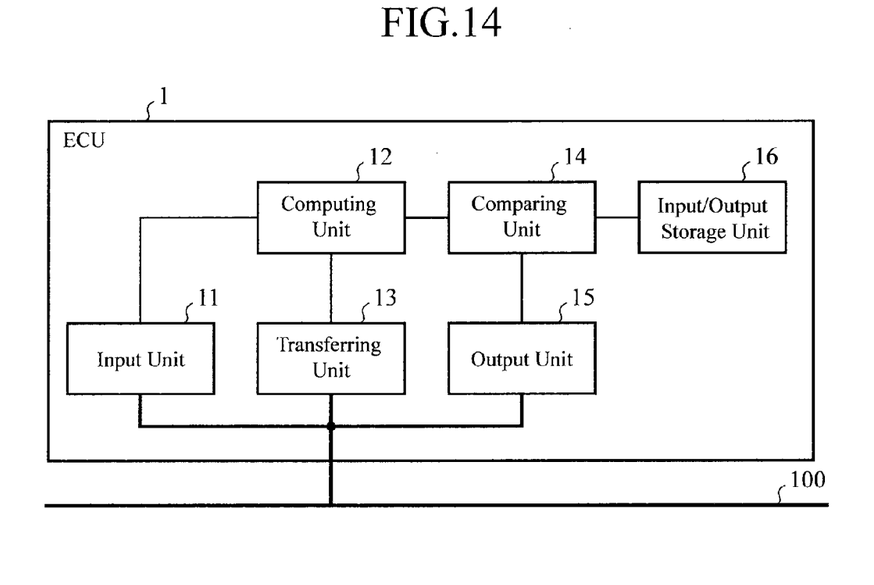
FIG. 14 is a block diagram showing one node in a redundancy device in accordance with Embodiment 6 of the present invention.
Figure 15:
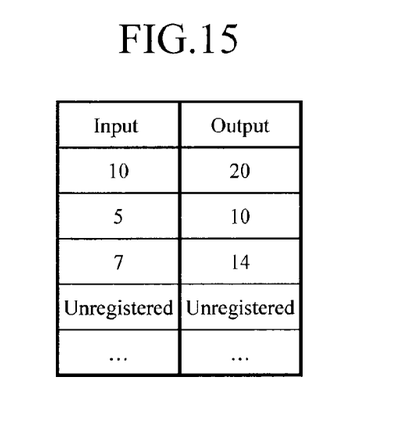
FIG. 15 is an explanatory drawing showing an input/output table in the redundancy device in accordance with Embodiment 6 of the present invention.

Embodiment 6 relates to a structure for further reducing increase in the load on a CPU and increase in the load on a network. The structure of an ECU in accordance with Embodiment 6 is shown in FIG. 14. In the structure shown in FIG. 14, an input/output storage unit 16 is additionally connected to the structure shown in FIG. 1. This input/output storage unit 16 holds an input/output table showing a correspondence, as shown in FIG. 15, between input data and output data.

Figure 16:
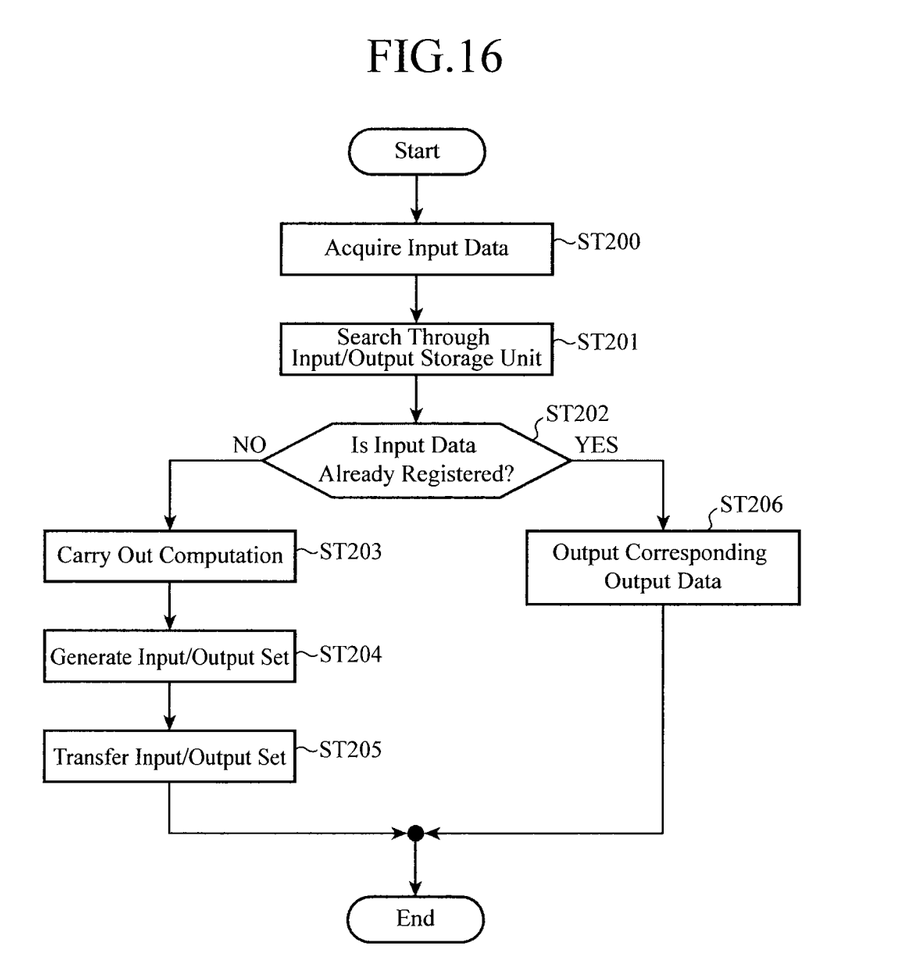
FIG. 16 is a flow chart showing the operation of a node which transmits an input/output set in the redundancy device in accordance with Embodiment 6 of the present invention.

An example of the operation of a start node in a redundancy device in accordance with Embodiment 6 is shown in FIG. 16. The start node acquires input data by using an input unit 11 (step ST200). A comparing unit 14 then retrieves whether the input data exists in the input/output storage unit 16 (step ST201). When the input data exists in the input/output storage unit (step ST202), the start node outputs the output data corresponding to the input data by using an output unit 15 (step ST206), and ends the process. In this case, because the start node does not carry out a transfer of an input/output set to another ECU within the group, the load on the network decreases, and the load on the other ECU decreases because the other ECU which would have received the input/output set if the start node had transferred the input/output set to the other ECU does not have to carry out any arithmetic processing. In contrast, when the input data does not exist in the input/output storage unit 16, the start node transfers an input/output set to the other ECU within the group, like that in accordance with Embodiment 1 (steps ST203 to ST205).

Figure 17:
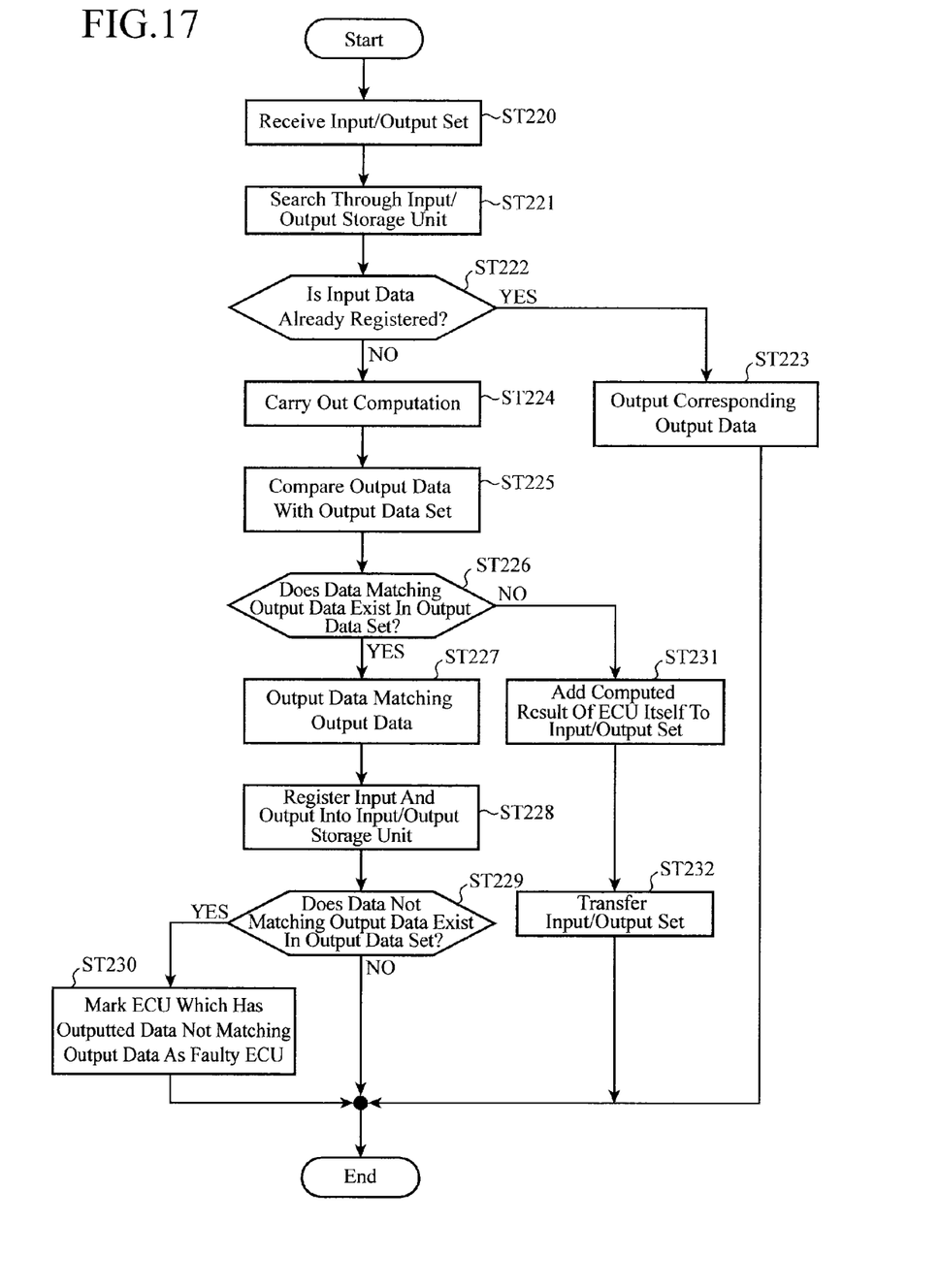
FIG. 17 is a flow chart showing the operation of a node which has received an input/output set in the redundancy device in accordance with Embodiment 6 of the present invention.

The operation of an ECU which has received an input/output set is shown in FIG. 17. The ECU which has received the input/output set (step ST220) retrieves whether or not the input data is registered in the input/output storage unit 16 by using a comparing unit 14 (step ST221), and, when the input data is registered in the input/output storage unit (step ST222), outputs the output data corresponding to the input data by using the output unit 15 (step ST223). As will be mentioned below, because data stored in the input/output storage unit 16 is output data matching other output data outputted from one or more ECUs, the ECU uses output data stored in the input/output storage unit 16 on a priority basis. When the input data is not registered, the ECU carries out the same processes as those in steps ST123 to ST128 in accordance with Embodiment 1 (steps ST224 to ST227, and ST229 to ST232). When the output data acquired for the input data matches either one of the output data in the output data set, the ECU stores the input data and the output data matching either one of the output data in the output data set in the input/output table (step ST228).

In the operation of the ECU which has received the input/output set, there is also a method of performing up to a process of acquiring output data from the input data and comparing the output data with the output data set, as shown in FIG. 9 explained in Embodiment 1, and, when the output data does not match any output data in the output data set, searching through the input/output table. As an alternative, a method of searching through the input/output table also when the output data matches any output data in the output data set, and, when the registered data differs from the output data matching any output data in the output data set, updating the contents of the table is also considered.

Thus, although the redundancy device in accordance with Embodiment 6 needs to include the input/output storage unit 16 in addition to the structure in accordance with any one of Embodiments 1 to 5, the redundancy device can further decrease the load on each node and the load on the network.

As explained above, because the redundancy device in accordance with Embodiment 6 groups the plurality of nodes connected to the network and implements redundancy by enabling nodes within each group to exchange input and output data with one another, and each node includes the input/output storage unit for holding the input/output table showing output data brought into correspondence with input data, and, when arbitrary input data is inputted thereto, determines whether the output data corresponding to the arbitrary input data exists in the input/output table, and, when the corresponding output data exists in the input/output table, sets the output data as the output of the node itself, the redundancy device can decrease the load on each node and the load on the network.

Further, because in the redundancy device in accordance with Embodiment 6, each node includes the computing unit for, when the output data corresponding to the input data does not exist in the input/output table, carrying out a computation on the input data, and the transferring unit for making a set of the input data and the computed value of the computing unit, and transferring the set to another node, the redundancy device can contribute to the detection of a faulty node within each group.

In addition, because in the redundancy device in accordance with Embodiment 6, when receiving an input/output set including input data and a computed value of another node within the group, each node determines whether the output data corresponding to the input data included in the input/output set exists in the input/output table, and, when the corresponding output data exists in the input/output table, sets the output data as the output of the node itself, the redundancy device can decrease the load on each node and the load on the network.

Further, because in the redundancy device in accordance with Embodiment 6, each node includes the comparing unit for comparing the computed value of the computing unit with a computed value of another node included in the input/output set, and the output unit for, when the result of the comparison by the comparing unit shows that the computed value of the computing unit matches a computed value of another node, outputting the matching computed value as the output data of the node itself, and the input/output storage unit registers the computed value of the computing unit into the input/output table as the output data corresponding to the input data the redundancy device can easily manage the data included in the input/output table.

In addition, because in the redundancy device in accordance with Embodiment 6, when the input data does not exist in the input/output table, the computing unit carries out a computation on the above-mentioned input data, and the comparing unit compares the computed value of the above-mentioned computing unit with a computed value of another node included in the input/output set, and, when no computed value matching the computed value of the computing unit exists in the input/output set, the transferring unit adds the computed value of the above-mentioned computing unit to the above-mentioned input/output set and transfers this input/output set, the redundancy device can contribute to the detection of a faulty node within each group.

While the invention has been described in its preferred embodiments, it is to be understood that an arbitrary combination of two or more of the embodiments can be made, various changes can be made in an arbitrary component in accordance with any one of the embodiments, and an arbitrary component in accordance with any one of the embodiments can be omitted within the scope of the invention.

INDUSTRIAL APPLICABILITY

As mentioned above, the redundancy device in accordance with the present invention achieves redundancy in a system by grouping a plurality of ECUs each of which has the same function and the same H/W structure as any other ECU, and by enabling ECUs within each group to exchange inputs and outputs with one another to make a comparison between their outputs, the redundancy device is suitable for use in a distributing system such as a vehicle-mounted system.

EXPLANATIONS OF REFERENCE NUMERALS

1, 2, . . . , and n ECU, 11 input unit, 12 computing unit, 13 transferring unit, 14 comparing unit, 15 output unit, 16 input/output storage unit, 100 vehicle-mounted LAN.

The invention claimed is:

1. A redundancy device that implements redundancy by grouping a plurality of nodes connected to a network, and enabling nodes within each group to exchange input and output data with one another within the group, the redundancy device comprising:

the plurality of nodes, wherein
each of said nodes includes:
- a computing unit, implemented by circuitry and configured to receive either input data or an input/output set including said input data and a computed value of another node within the group, and carry out a computation on said input data,
- a comparing unit, implemented by the circuitry and configured to, when said input/output set is inputted thereto, compare a computed value of said computing unit with the computed value of said other node,
- an output unit, implemented by the circuitry and configured to, when a result of the comparison by said comparing unit shows that the computed value of said computing unit matches either one of computed values, output said computed value as output data of the node itself, and
- a transferring unit, implemented by the circuitry and configured to, when the result of the comparison by said comparing unit shows that the input/output set does not include any computed value matching the computed value of said computing unit, add the computed value of said computing unit to the input/output set and then transfer this input/output set to another node.

2. The redundancy device according to claim 1, wherein when the result of the comparison by the comparing unit shows that the input/output set includes a computed value matching the computed value of the computing unit and a computed value not matching the computed value of the computing unit, said redundancy device determines that a node which has transferred said computed value not matching the computed value of the computing unit is faulty, and notifies a node within the group to that effect.

3. The redundancy device according to claim 1, wherein the transferring unit transfers the input/output set to which the computed value of the computing unit is added to another node before a predetermined response time period has elapsed.

4. The redundancy device according to claim 1, wherein said redundancy device outputs a default value or a previous value when not finding out a computed value matching the computed value of the computing unit before a predetermined response time period has elapsed.

5. The redundancy device according to claim 1, wherein when computed values of N nodes (N is an arbitrary integer) match one another, said redundancy device outputs said matching computed value as output data.

6. The redundancy device according to claim 1, wherein said redundancy device defines a maximum number of times that said redundancy device carries out a transfer of data when no computed value matching any other computed value is acquired, and the transferring unit carries out a transfer of data until the number of times that said redundancy device has carried out a transfer of data reaches said maximum number of times.

7. A redundancy device that implements redundancy by grouping a plurality of nodes connected to a network, and enabling nodes within each group to exchange input and output data with one another within the group, the redundancy device comprising:

the plurality of nodes, wherein
each of said nodes includes:
- a computing unit, implemented by circuitry and configured to receive either input data or an input/output set including said input data and a computed value of another node within the group, and carry out a computation on said input data,
- a transferring unit, implemented by the circuitry and configured to add a computed value of said computing unit to said input/output set, and transfer said input/output set to another node within said group until a number of times that said redundancy device has carried out a transfer of data reaches a predetermined number of times, and
- an output unit, implemented by the circuitry and configured to selectively output a most frequently computed value from the computed value of said computing unit and the computed value of said other node which are acquired through the transferring operation which has been carried out said predetermined number of times.

8. A redundancy device that implements redundancy by grouping a plurality of nodes connected to a network, and enabling nodes within each group to exchange input and output data with each other within the group, the redundancy device comprising:

the plurality of nodes, wherein
each of said nodes includes:
- a computing unit, implemented by circuitry and configured to receive either input data or an input/output set including said input data and a computed value of another node within the group, and carry out a computation on said input data,
- a transferring unit, implemented by the circuitry and configured to add the computed value of said computing unit to said input/output set, and carry out a transfer of said input/output set to another node in said group until a predetermined deadline has been reached within a cycle, and
- an output unit, implemented by the circuitry and configured to selectively output a most frequently computed value from the computed value of said computing unit and the computed value of said other node which have been acquired until said predetermined deadline.

* * * * *